No. 779,060. PATENTED JAN. 3, 1905.
S. E. AUKER.
CULTIVATOR TOOTH.
APPLICATION FILED JULY 29, 1904.
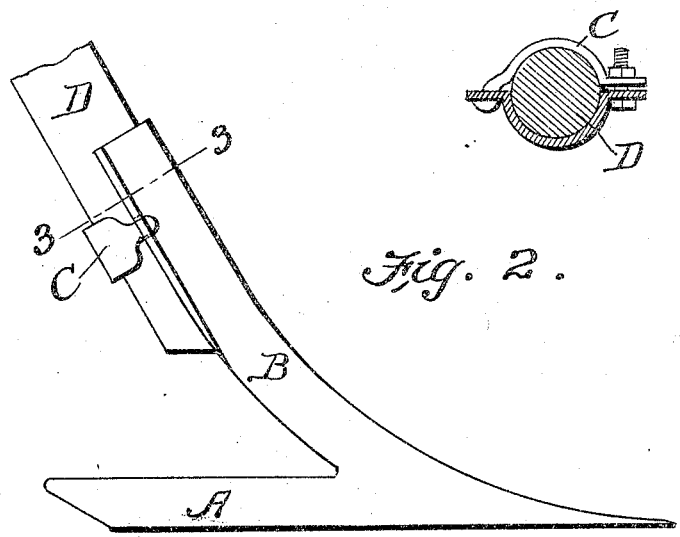
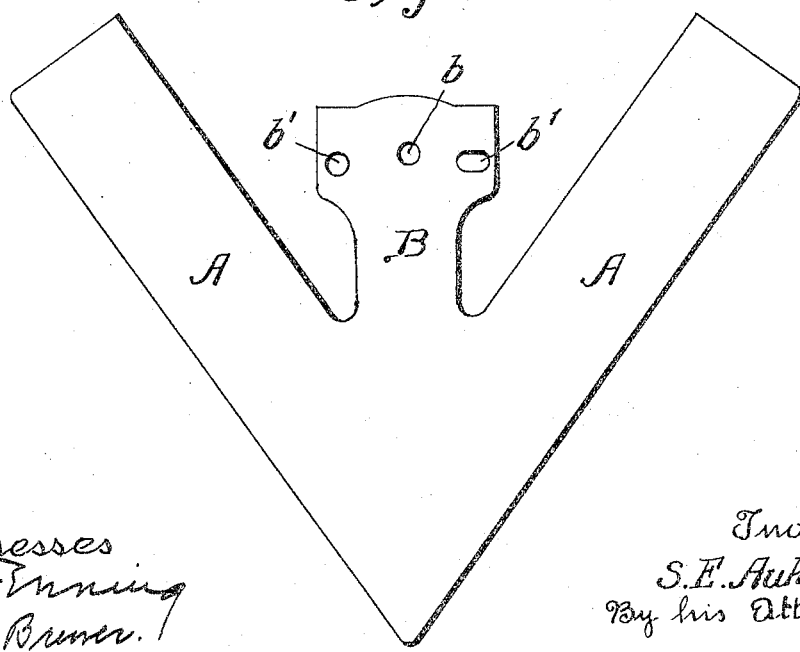

No. 779,060.                                          Patented January 3, 1905.

UNITED STATES PATENT OFFICE.

STEPHEN E. AUKER, OF WAYNE, NEBRASKA.

CULTIVATOR-TOOTH.

SPECIFICATION forming part of Letters Patent No. 779,060, dated January 3, 1905.

Application filed July 29, 1904. Serial No. 218,629.

*To all whom it may concern:*

Be it known that I, STEPHEN E. AUKER, a citizen of the United States, residing at Wayne, in the county of Wayne and State of Nebraska, have invented certain new and useful Improvements in Cultivator-Teeth, of which the following is a specification.

After the seed has been sown in a field it is necessary to cultivate the ground for the double purpose of killing weeds and other injurious or undesirable plants and keeping the soil light and well broken up, so as to give suitable place to the roots of the plants to be cultivated.

The object of my invention is to provide a tool which will perform both of these functions with a maximum efficiency and a minimum expenditure of labor. To this end I provide an attachment for cultivators to take the place of the ordinary shovel, which may be attached to the ordinary shovel-shank.

My invention consists of a device which will uproot and destroy weeds and at the same time will break up and make light a thin layer of earth on the surface of the field. It is so made that it will cover the whole space between the rows of plants to be cultivated and cultivate the entire field except that portion occupied by the roots of said plants. In plan my device is V-shaped, the center being in advance of the sides, which are slightly inclined upward from the outer edges and may be sharpened on the outer edges. From the junction of the two blades rises a tongue integral therewith, by which they may be attached to the cultivator-shank, to fit which the tongue may be curved. If the shank is of wood, my attachment may be connected to it by means of a bolt passed through it, and the tongue or the attachment may be fastened to the shank in any suitable manner.

In the drawings, Figure 1 is a plan view of my invention. Fig. 2 is a side view showing it attached to the shank of a cultivator. Fig. 3 is a transverse section on the line 3 3 of Fig. 2.

The device has two blades A A, which are arranged at an acute angle to each other, so as to form a V-shaped cutting edge with the center in advance of the sides. The blades are made of some thin stiff metal, such as sheet iron or steel, and may be sharpened on their outer edges, so as to more readily sever the roots of weeds, &c. They are set so that there is a slight rise from the cutting edge to the inner edge of each blade, which may be two or three inches wide and ten inches or more long, thus insuring a complete severing of all roots in its path. The distance between the rear ends of the cutting edges of the blades is very nearly the distance apart of the rows of plants to be cultivated, so that as much of the earth as possible may be cultivated by a single passage of the cultivator over the field.

Just back of the junction-point of the two blades rises with a backward inclination a tongue B, by which the tooth is attached to a shank D of the cultivator. The tongue is slightly curved to fit the shank and has at its sides flat wings. Near its top I provide a hole $b$ in the curved portion and holes $b'$ in both wings, one of which holes is elongated, so as to allow of adjustment of the bolt which passes therethrough, as hereinafter described.

It will be readily seen that the device can be cheaply and rapidly made from a single piece of sheet metal and bent into shape.

My device may be fastened to the shank of a cultivator in any well-known manner; but I prefer to use a semicircular band C, which at one end is rivet-headed through the smaller hole $b'$ in the wing and has a bolt at its other end which passes through the elongated hole $b'$ in the other wing after the band C has been passed on the other side of the shank from the tongue B, as shown in Figs. 2 and 3. The device may also be attached by passing a bolt through the central hole $b$ in the tongue and a hole prepared for it in the shank.

I have found that by the use of four of these teeth instead of the ordinary shovels on a cultivator I am able to destroy all the weeds and to give surface cultivation to all the land, leaving a blanket of loose soil on the surface, which retains the moisture and at the same time leaves the roots of the cultivated plants undisturbed. By the use of a low-lying tooth such as I provide clogging of the roots of the weeds is to a great extent avoided and the number of horses required to propel the cultivator is reduced.

I claim as my invention—

The combination with a cultivator-standard, of a shallow V-shaped blade formed with a central upwardly-inclined tongue which is semicircular in cross-section and has laterally-projecting perforated flanges on opposite sides, a coupling-strap pivotally connected with one of said flanges and a bolt extending through an elongated opening in the opposite flange and through the strip for the purpose specified.

In testimony whereof I have hereunto subscribed my name.

STEPHEN E. AUKER.

Witnesses:
 A. R. DAVIS,
 A. A. WELCH.